United States Patent
Caverly

(10) Patent No.: US 9,522,694 B2
(45) Date of Patent: Dec. 20, 2016

(54) RADIAL TELESCOPE BUSHING FOR STEERING COLUMN

(71) Applicant: STEERING SOLUTIONS IP HOLDING CORPORATION, Saginaw, MI (US)

(72) Inventor: Jacob A. Caverly, Freeland, MI (US)

(73) Assignee: STEERING SOLUTIONS IP HOLDING CORPORATION, Saginaw, MI (US)

( * ) Notice: Subject to any disclaimer, the term of this patent is extended or adjusted under 35 U.S.C. 154(b) by 0 days.

(21) Appl. No.: 14/633,714

(22) Filed: Feb. 27, 2015

(65) Prior Publication Data

US 2016/0252133 A1    Sep. 1, 2016

(51) Int. Cl.
| | |
|---|---|
| *B62D 1/185* | (2006.01) |
| *F16C 29/02* | (2006.01) |
| *F16C 29/00* | (2006.01) |
| *F16C 43/02* | (2006.01) |

(52) U.S. Cl.
CPC ............. *B62D 1/185* (2013.01); *F16C 29/001* (2013.01); *F16C 29/02* (2013.01); *F16C 43/02* (2013.01)

(58) Field of Classification Search
CPC ......... B62D 1/185; F16B 35/005; F16C 29/02
USPC  384/10; 411/393; 403/362; 74/493; 280/775
See application file for complete search history.

(56) References Cited

U.S. PATENT DOCUMENTS

| | | | | |
|---|---|---|---|---|
| 3,501,993 A | * | 3/1970 | Swenson ............... | F16B 35/005 411/393 |
| 5,722,299 A | | 3/1998 | Yamamoto et al. | |
| 5,848,557 A | * | 12/1998 | Sugiki ................... | B62D 1/181 403/362 |
| 6,142,485 A | * | 11/2000 | Muller ................ | B23B 31/1075 279/83 |
| 6,328,343 B1 | * | 12/2001 | Hosie .................... | E21B 17/046 285/123.13 |
| 7,516,991 B1 | * | 4/2009 | Cheng .................. | F16B 7/1472 285/404 |
| 8,935,968 B2 | | 1/2015 | Sugiura | |
| 9,022,426 B2 | | 5/2015 | Sakata | |
| 9,022,427 B2 | | 5/2015 | Schnitzer | |
| 2003/0185648 A1 | * | 10/2003 | Blaess ................... | H01R 4/366 411/393 |
| 2003/0209897 A1 | * | 11/2003 | Manwaring ............ | B62D 1/184 280/775 |
| 2003/0227163 A1 | | 12/2003 | Murakami et al. | |
| 2004/0200306 A1 | | 10/2004 | Schafer | |
| 2007/0137379 A1 | | 6/2007 | Sanji et al. | |
| 2007/0194563 A1 | | 8/2007 | Menjak et al. | |
| 2008/0106086 A1 | | 5/2008 | Shimoda | |
| 2009/0200783 A1 | * | 8/2009 | Cymbal ................. | B62D 1/185 280/775 |

(Continued)

FOREIGN PATENT DOCUMENTS

JP    2011057020 A    3/2011

*Primary Examiner* — Ruth Ilan

(74) *Attorney, Agent, or Firm* — Cantor Colburn LLP

(57) ABSTRACT

A bushing assembly for a steering column having a fixed jacket and a telescope jacket is provided having a set screw configured for insertion into the fixed jacket, and a radial telescope bushing co-acting with the set screw and having a post and a curved bushing portion configured to pre-load the radial telescope bushing against the telescope jacket to provide a lash-free interface between the fixed jacket and the telescope jacket.

10 Claims, 3 Drawing Sheets

(56) References Cited

U.S. PATENT DOCUMENTS

| | | |
|---|---|---|
| 2012/0125139 A1 | 5/2012 | Tinnin et al. |
| 2012/0125140 A1 | 5/2012 | Ridgway et al. |
| 2013/0205933 A1 | 8/2013 | Moriyama |
| 2014/0109713 A1* | 4/2014 | Bodtker ................ B62D 1/184 74/493 |
| 2014/0109714 A1 | 4/2014 | Bodtker |
| 2014/0137694 A1 | 5/2014 | Sugiura |
| 2014/0147197 A1 | 5/2014 | Yoshida et al. |
| 2015/0028574 A1 | 1/2015 | Meyer et al. |
| 2015/0166093 A1 | 6/2015 | Moriyama et al. |
| 2015/0232117 A1 | 8/2015 | Stinebring et al. |
| 2015/0239490 A1 | 8/2015 | Sakata |
| 2015/0251683 A1 | 9/2015 | Caverly et al. |
| 2016/0046318 A1 | 2/2016 | Stinebring et al. |

\* cited by examiner

RADIAL TELESCOPE BUSHING FOR STEERING COLUMN

FIELD OF THE INVENTION

The following description relates to steering columns for motor vehicles and, more specifically, to a telescope bushing assembly for a steering column.

BACKGROUND

Some known steering columns for motor vehicles are provided with mechanisms for adjusting the steering column position by an operator of the motor vehicle. Available adjustments typically include a telescoping adjustment in which the steering column is extended toward the operator or retracted away from the operator, and a tilt or rake adjustment in which an angular position of the steering column is changed relative to the operator.

In some known systems, a telescope bushing is used to provide a compliant bushing material to facilitate telescope action. In order to provide for a lash-free telescope joint, the telescope bushing is constricted around a telescoping member by way of injected material and pressurized into a cavity between the telescope bushing and a fixed jacket component. Upon solidification, the injected material de-lashes the telescope joint. However, the injection process and resulting telescope bushing may be greatly influenced by environmental variables, which may result in poor wear characteristics.

Accordingly, it is desirable to provide a telescope bushing that minimizes components, increases ease of assembly, and de-lashes a telescope interface while providing a wear-compensating surface.

SUMMARY OF THE INVENTION

In one exemplary embodiment of the present invention, a bushing assembly for a steering column having a fixed jacket and a telescope jacket is provided. The bushing assembly includes a set screw configured for insertion into the fixed jacket, and a radial telescope bushing co-acting with the set screw and having a post and a curved bushing portion configured to pre-load the radial telescope bushing against the telescope jacket to provide a lash-free interface between the fixed jacket and the telescope jacket.

In another exemplary embodiment of the present invention, a steering column assembly is provided. The steering column assembly includes a steering column shaft, a fixed jacket having a jacket aperture formed therein, a telescope jacket configured for telescopic movement relative to the fixed jacket, and a bushing assembly. The bushing assembly includes a set screw disposed in the jacket aperture, and a radial telescope bushing co-acting with the set screw and having a post and a curved bushing portion configured to pre-load the radial telescope bushing against the telescope jacket to provide a lash-free interface between the fixed jacket and the telescope jacket.

In yet another exemplary embodiment of the present invention, a method of fabricating a bushing assembly for a steering column having a fixed jacket and a telescope jacket is provided. The method includes providing a set screw configured for insertion into the fixed jacket, and forming a radial telescope bushing having a post extending within the set screw and a curved bushing portion configured to pre-load the radial telescope bushing against the telescope jacket to provide a lash-free interface between the fixed jacket and the telescope jacket.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
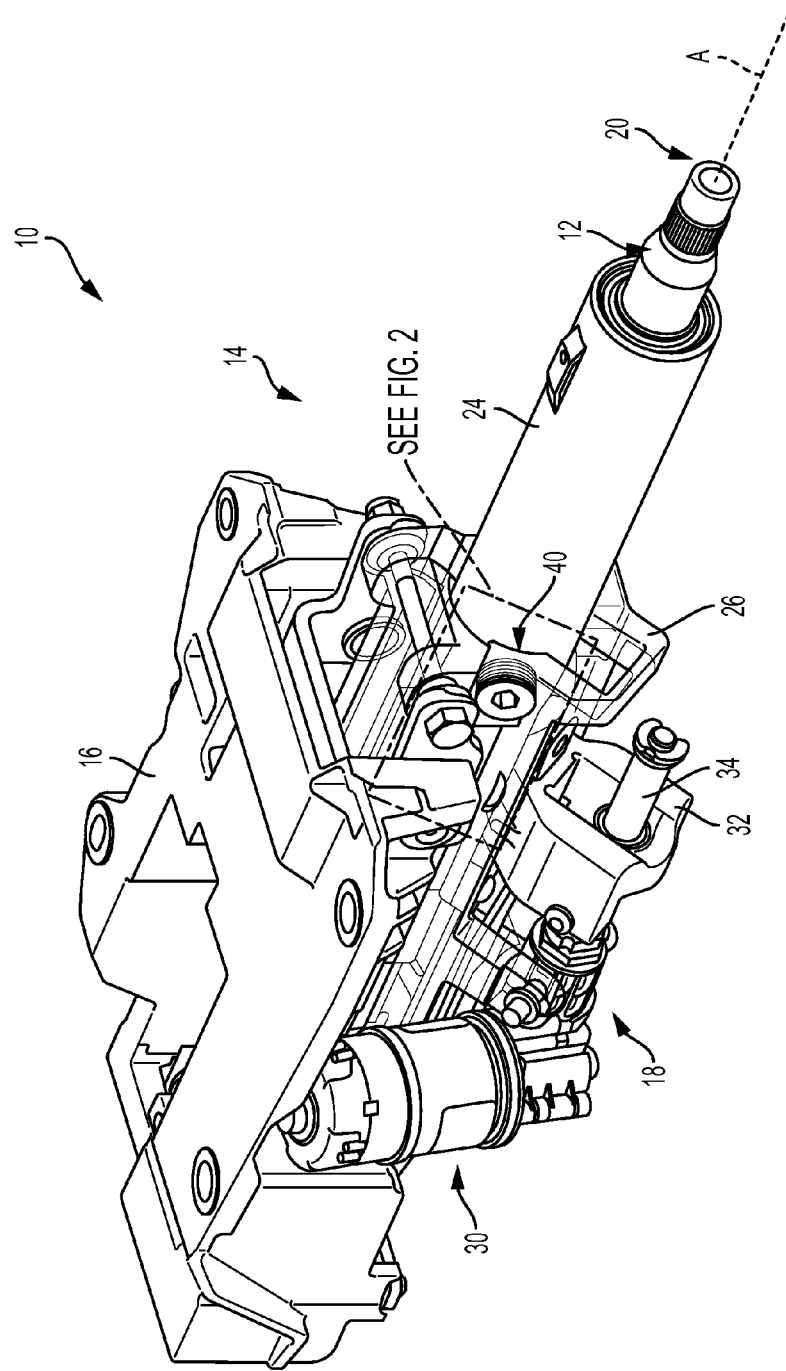
FIG. 1 is a perspective view of an exemplary steering column assembly.

Referring now to the Figures, where the invention will be described with reference to specific embodiments, without limiting same, FIG. 1 illustrates an exemplary steering column assembly 10 for a vehicle (not shown). As shown in FIG. 1, steering column assembly 10 generally includes a steering column shaft 12, a jacket assembly 14 positioned about shaft 12, a mounting bracket 16, and a telescope actuator assembly 18.

Steering shaft 12 extends along an axis 'A', and a steering wheel (not shown) is attached to a first end 20 of shaft 12 while an opposite second end (not shown) of shaft 12 is coupled to a steering gear (not shown). Jacket assembly 14 surrounds and supports shaft 12 and includes an upper jacket 24 and a lower jacket 26. Mounting bracket 16 supports jacket assembly 14 and mounts assembly 14 to the vehicle.

In the embodiment shown, telescope actuator assembly 18 includes an electric motor 30 and gearing (not shown) for transferring rotatory motion of electric motor 30 to move steering shaft 12 in the telescope direction. More specifically, a drive bracket 32 transmits linear motion from motor 30 via a leadscrew 34 to upper jacket 24 during telescopic adjustment of steering column assembly 10. When telescopic movement is commanded, actuator assembly 20 is operated to vary a telescopic relationship between upper jacket 24 and lower jacket 26. In another embodiment (not shown), the telescope actuator assembly may be manually adjusted.

Figure 2:
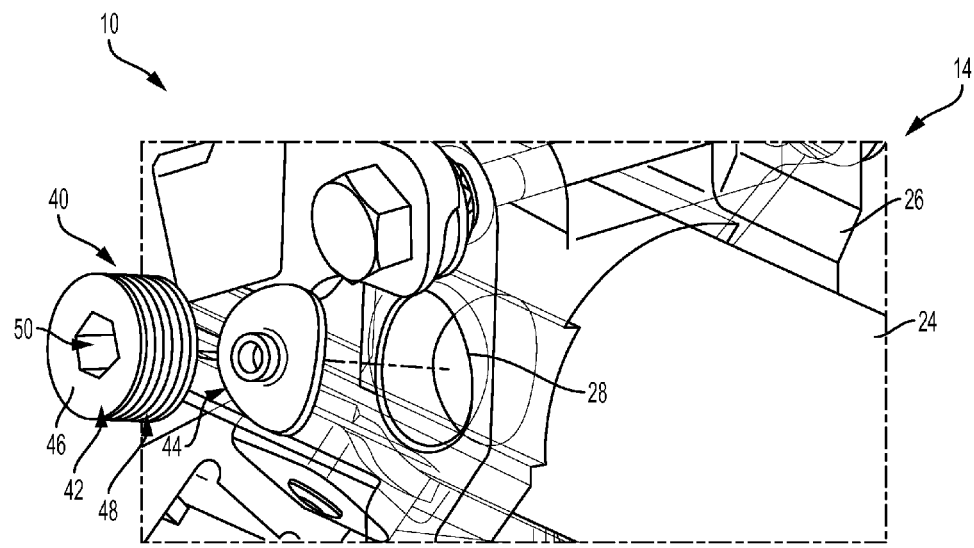
FIG. 2 is an enlarged view of section 2 shown in FIG. 1, partially in exploded view, before assembly of the invention.

As illustrated in FIG. 2, a telescope bushing assembly 40 is configured for insertion into a threaded aperture 28 formed in lower jacket 26 to provide a de-lashing force between telescoping upper jacket 24 and fixed lower jacket 26. Telescope bushing assembly 40 generally includes a set screw 42 and a radial telescope bushing 44.

Figure 4:
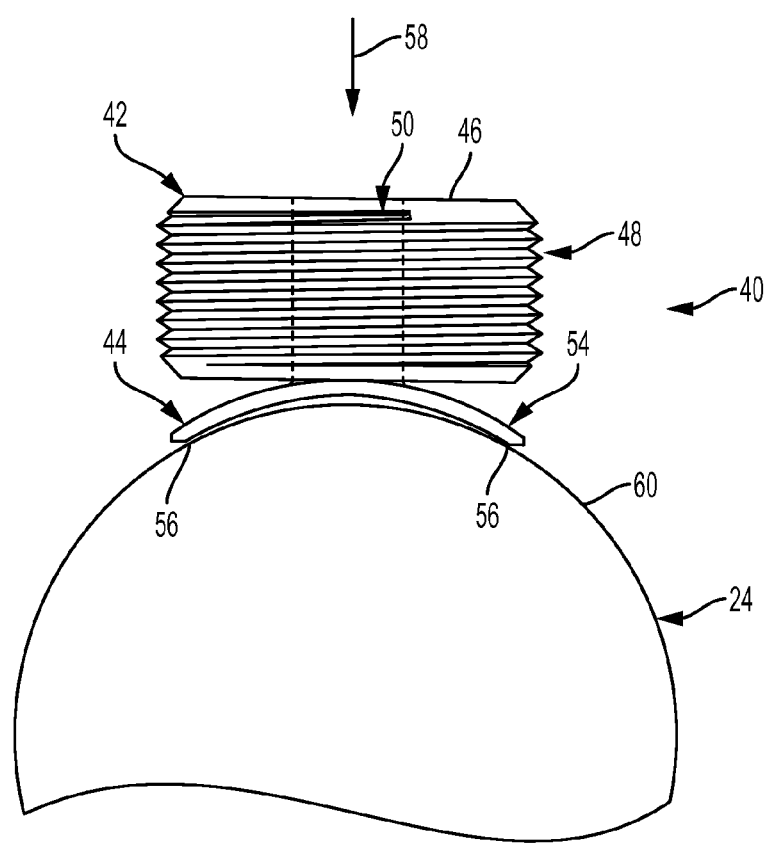
FIG. 4 is a side view of the radial telescope bushing assembly shown in FIGS. 1 and 2.

With additional reference to FIG. 4, set screw 42 is generally cylindrical and includes a body 46 having a threaded outer surface 48 and an aperture 50. Threaded outer surface 48 is configured to meshingly engage threaded aperture 28 such that set screw 42 may be selectively screwed into and out of threaded aperture 28. Aperture 50 is configured to receive one or more tools (not shown) to facilitate insertion and removal of set screw within threaded aperture 28.

Figure 3:
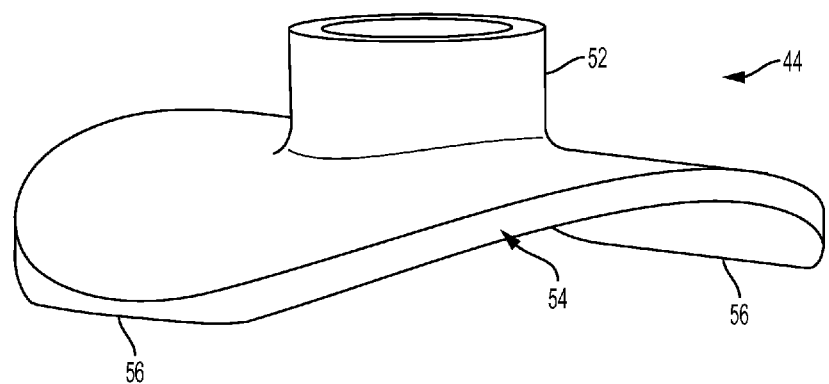
FIG. 3 is a perspective view of an exemplary radial telescope bushing shown in FIGS. 1 and 2.

With additional reference to FIGS. 3 and 4, radial telescope bushing 44 generally includes a post 52 and a curved free-state bushing portion 54 extending about post 52. In the embodiment shown, free-state bushing portion 54 is elastically deformable in a radial direction extending from post 52. In the exemplary embodiment, post 52 and curved bushing portion 54 are formed integrally as a single component. Post 52 is inserted into set screw aperture 50 to maintain radial positioning relative to set screw 42 and lower jacket 26. Curved bushing portion 54 provides a biasing effect against upper jacket 24 as it is driven against the curved upper jacket 24 by set screw 42.

In the embodiment shown, free-state bushing portion 54 appears as a hat brim shape about post 52. As shown in FIG. 4, curved bushing portion 54 is in the form of an arc between opposite outboard edges 56 of radial telescope bushing 44. Curved bushing portion 54 has a free-state radius of curvature that is generally less than a radius of curvature of telescoping upper jacket 24. This creates a free-state region of contact that is located at the opposite outboard edges 56 of radial telescope bushing 44. As set screw 42 is driven into threaded aperture 28 of lower jacket 26 in a direction shown by arrow 58, radial telescope bushing 44 is elastically forced to generally conform to outer surface 60 of upper jacket 24, which provides a spring loaded pre-load to upper jacket 24 about outboard edges 56 that de-lashes the interface between jackets 24, 26. However, in the embodiment shown, the telescope bushing assembly 40 will have clearance between bushing portion 54 and upper jacket 24. When assembled, radial telescope bushing 44 is disposed radially outward of upper jacket 24 and radially inward of lower jacket 26.

Radial telescope bushing 44 may be included with various coatings to provide desired wear and lubricity characteristics. Further, material thickness, diameter, post size, and other features of radial telescope bushing 44 may be tuned to vary the bushing's effective spring rate such that bushing 44 may be used an a multitude of applications.

Further, assembly 10 may include two sets of telescope bushing assemblies 40 to bias the telescoping jacket 24 against the inner diameter of fixed jacket 26. This enables the radial points of de-lashing contact to be equally space, resulting in the assembly being insensitive to component variation and enabling assembly 10 to be disassembled and reassembled while still yielding the same performance. Additionally, when loaded against telescoping jacket 24, the geometry of busing 44 is self-stabilizing during assembly, resulting in radial self-alignment during torque procedure. Accordingly, bushing assembly 40 provides a geometry that, when loaded against mating components, acts like a spring. This spring effect serves as a means to compensate for wear of telescoping interfaces to maintain a de-lashed joint. Further, bushing assembly 40 provides a wear surface for telescoping jacket 24 to ride against during telescope function, provides a surface and positioning geometry for set screw 42 to interface that complements and facilitates the spring effect, and provides a self-stabilizing geometry that rotationally orients components relative to the axis of telescope movement during assembly.

Described herein are systems and methods that facilitate de-lashing a telescope joint. The systems include a telescope bushing assembly having a set screw and a radial telescope bushing. The radial telescope bushing includes a curved surface that provides a pre-load against a telescoping jacket of the system. As such, previous injection processes are eliminated in exchange for a fastening process that drives the set screw into the radial telescope bushing to de-lash the telescope jacket to the fixed jacket. Further, stroke load can be monitored in concert with the fastening process to provide feedback, and the bushing assembly provides improved and repeatable performance in static stiffness and natural frequency due to guaranteed points of contact between the bushing and the telescope jacket.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
   a. a steering column shaft;
   b. a fixed jacket having a jacket aperture formed therein;
   c. a telescope jacket configured for telescopic movement relative to the fixed jacket; and
   d. a bushing assembly comprising:
      i. a set screw disposed in the jacket aperture; and
      ii. a radial telescope bushing co-acting with the set screw and having a post and a curved bushing portion configured to pre-load the radial telescope bushing against the telescope jacket to provide a lash-free interface between the fixed jacket and the telescope jacket.

2. The steering column assembly of claim 1, wherein the set screw includes an aperture formed therein.

3. The steering column assembly of claim 2, wherein at least a portion of the post is inserted into the aperture.

4. The steering column assembly of claim 1, wherein the set screw includes a threaded outer surface.

5. The steering column assembly of claim 4, wherein the jacket aperture is threaded to receive the set screw threaded outer surface.

6. The steering column assembly of claim 1, wherein the curved bushing portion has a radius of curvature that is less than a radius of curvature of the telescope jacket.

7. The steering column assembly of claim 1, wherein the curved bushing portion is disposed between the telescope jacket and the fixed jacket.

8. The steering column assembly of claim 1, wherein the radial telescope bushing is disposed radially outward of an outer surface of the telescope jacket.

9. The steering column assembly of claim 1, further comprising a telescope actuator assembly configured to telescopically move the telescope jacket relative to the fixed jacket.

10. The steering column assembly of claim 1, wherein the post and the curved bushing portion are formed integrally as a single component to form the radial telescope bushing.

\* \* \* \* \*